US007133763B2

(12) United States Patent
Yasui

(10) Patent No.: US 7,133,763 B2
(45) Date of Patent: Nov. 7, 2006

(54) CONTROL APPARATUS FOR CONTROLLING A PLANT BY USING A DELTA-SIGMA MODULATION ALGORITHM

(75) Inventor: Yuji Yasui, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 27 days.

(21) Appl. No.: 11/050,646

(22) Filed: Feb. 4, 2005

(65) Prior Publication Data

US 2005/0203642 A1 Sep. 15, 2005

(30) Foreign Application Priority Data

Mar. 12, 2004 (JP) ............................ 2004-070312

(51) Int. Cl.
*G05D 1/00* (2006.01)
*B60T 7/12* (2006.01)
*G06F 7/00* (2006.01)
*G06F 17/00* (2006.01)

(52) U.S. Cl. ...................... 701/108; 701/102; 701/103; 701/107; 701/109; 700/28; 700/37; 700/39; 137/82; 431/61; 431/62; 340/870.18

(58) Field of Classification Search ................. 700/28, 700/1, 19–20, 89, 33, 35, 37, 39; 701/102–103, 701/107, 108–109; 341/143, 144, 155; 431/61, 431/62; 340/870.18; 137/82
See application file for complete search history.

(56) References Cited

U.S. PATENT DOCUMENTS 5,598,159 A * 1/1997 Hein .......................... 341/143
6,661,363 B1 * 12/2003 Zierhofer .................... 341/143
6,885,326 B1 * 4/2005 Zierhofer .................... 341/143
6,904,355 B1 * 6/2005 Yasui et al. ................. 701/108
2005/0075780 A1 * 4/2005 Yasui et al. ................. 701/109
2005/0162297 A1 * 7/2005 Zierhofer .................... 341/143

FOREIGN PATENT DOCUMENTS

EP 001574695 A2 * 9/2005
JP 2003-195908 7/2003

* cited by examiner

*Primary Examiner*—Ramesh Patel
(74) *Attorney, Agent, or Firm*—Arent Fox PLLC

(57) ABSTRACT

The invention provides a control apparatus comprising a controller for determining a manipulated variable for manipulating a controlled object so that an output of the controlled object converges to a desired value and a modulator for modulating the manipulated variable by using one of a delta-sigma modulation algorithm, a sigma-delta modulation algorithm and a delta modulation algorithm to generate a modulated signal to be applied to the controlled object. The modulator generates the modulated signal so that a center value of an amplitude of the modulated signal follows a change of the manipulated variable. Thus, the modulated signal in which the manipulated variable is reflected without any loss can be generated even when the manipulated variable changes.

21 Claims, 14 Drawing Sheets

(a)

(b)

CONTROL APPARATUS FOR CONTROLLING A PLANT BY USING A DELTA-SIGMA MODULATION ALGORITHM

BACKGROUND OF THE INVENTION

The present invention relates to a control apparatus for accurately controlling a plant by using a delta-sigma (ΔΣ) modulation algorithm.

A method for controlling a plant (controlled object) by using a delta-sigma modulation algorithm (or a sigma-delta (ΣΔ) modulation algorithm or a delta (Δ) modulation algorithm) is known, as shown in the Japanese Patent Publication No. 2003-195908. As long as the plant is capable of generating an appropriate control output in response to a control input having an on/off switching behavior, the plant can be accurately controlled by the delta-sigma modulation algorithm.

FIG. 15 is a block diagram showing an example of a control scheme using a delta-sigma modulation algorithm. A controller 101 calculates a manipulated variable for causing a controlled variable of a plant to converge to a desired value. A modulator 102 uses the delta-sigma modulation algorithm to modulate the manipulated variable. The modulated manipulated variable is input into the plant 103. An output from the plant 103, which is the controlled variable, is fed back to the controller 101.

FIG. 16 shows exemplary behaviors of various signals in accordance with a control scheme using a conventional delta-sigma modulation algorithm. Rcain indicates the manipulated variable calculated by the controller 101. Vcain indicates the modulated manipulated variable, which is a modulated signal generated by the modulator 102. CAIN indicates an output from the plant 103, which is a controlled variable. CAIN_cmd indicates a desired value of the controlled variable. The modulated signal Vcain is generated to switch between +d and −d with respect to a predetermined center value. The amplitude of the modulated signal Vcain is 2*d*. When the manipulated variable Rcain is within the amplitude 2*d* of the modulated signal, the delta-sigma modulation algorithm is capable of reconstructing the manipulated variable Rcain as the modulated signal Vcain. During a period from time t0 to time t1, an appropriate modulated signal Vcain is generated because the magnitude of the manipulated variable Rcain is smaller than the amplitude 2*d* of the modulated signal. Thus, the controlled variable CAIN can be appropriately controlled to follow the desired value CAIN_cmd by applying the modulated signal Vcain to the plant.

However, when the magnitude of the manipulated variable Rcain exceeds the amplitude 2*d* of the modulated signal as shown from time t1, such increased manipulated variable Rcain cannot be appropriately modulated because the amplitude of the modulated signal is limited to 2*d*. A portion of the manipulated variable exceeding the amplitude 2*d* is not reflected in the modulated signal Vcain. As a result, the manipulated variable Rcain is substantially limited as shown by a dotted line 105. Since the modulated signal is generated with a portion of the manipulated variable Rcain being lost, a deviation occurs between the controlled variable CAIN and the desired value CAIN_cmd. Thus, from time t1, the plant cannot be appropriately controlled.

Such condition may occur, for example, in a phase control for a camshaft of an engine of a vehicle. When the phase of the camshaft is controlled by an actuator, that actuator is regarded as a plant. If the torque generated by the actuator decreases due to heat generated by the actuator, or if the friction characteristics of the actuator vary due to variations and age deterioration of the actuator, such condition may occur.

In order to handle such condition, there is considered a method for calculating in advance a maximum value and a minimum value which the manipulated variable can take. The amplitude 2*d* of the modulated signal is established to contain the maximum and minimum values. According to such a method, however, the amplitude of the modulated signal may increase. Such increase of the amplitude may destabilize the output of the plant.

An electromagnet may be used as the actuator. The electric current of the electromagnet decreases as the resistance of the electromagnet increases. This decrease of the electric current reduces the torque generated by the actuator. In order to avoid such decrease of the torque, there is considered a method for feedback controlling the electric current of the electromagnet and generating the torque corresponding to the manipulated variable determined by the feedback control. According to this method, the controlled variable can converge to a desired value even when some variations occur in the torque due to the electric current. However, such an electric current control cannot handle changes in the friction characteristics.

Thus, there is a need for an apparatus or method for implementing a delta-sigma modulation that is capable of generating a modulated signal adapted to changes in the manipulated variable.

SUMMARY OF THE INVENTION

According to one aspect of the present invention, a control apparatus comprises a controller for determining a manipulated variable for manipulating a controlled object to cause an output of the controlled object to converge to a desired value and a modulator for modulating the manipulated variable by using one of a delta-sigma modulation algorithm, a sigma-delta modulation algorithm and a delta modulation algorithm to generate a modulated signal that is to be applied to the controlled object. The modulator generates the modulated signal so that a center value of an amplitude of the modulated signal follows a change of the manipulated variable.

According to the present invention, the manipulated variable is not damaged due to the amplitude of the modulated signal because the center value of the amplitude of the modulated signal is changed in accordance with a change in the manipulated variable. Since the modulated signal generated without being damaged is applied to the controlled object, the output of the controlled object can accurately converge to a desired value.

Since the center value of the amplitude of the modulated signal is changed in accordance with a change of the manipulated variable, the amplitude of the modulated signal does not need to be increased so as to contain the maximum value and the minimum value of the manipulated variable. Since the amplitude of the modulated signal can be kept small, it can be suppressed that the output of the controlled object oscillates due to the switching characteristics of the modulated signal.

According to one embodiment of the present invention, the modulator further includes an adaptive offset generator for generating an adaptive offset value based on the manipulated variable. The modulator generates the modulated signal so that the adaptive offset value is the center value of the amplitude of the modulated signal. Thus, since the adaptive offset value is generated by the adaptive offset generator based on the manipulated variable, the modulated signal can be appropriately generated to adapt to a change of the manipulated variable.

According to one embodiment of the present invention, the adaptive offset generator further includes a filter for filtering the manipulated variable to suppress an abrupt change of the adaptive offset value. The adaptive offset generator generates the adaptive offset value based on an output from the filter.

If the center value of the amplitude of the modulated signal, which is the adaptive offset value, abruptly changes, the accuracy of causing the output of the controlled object to settle to a desired value (in other words, the degree of convergence of the output of the controlled object to a desired value) may deteriorate. Specifically, "fluctuation" may occur in the output of the controlled object when a desired value for the output of the controlled object becomes constant. Such fluctuation can be suppressed by filtering the manipulated variable.

According to one embodiment of the present invention, the adaptive offset generator further includes a unit for limiting the manipulated variable within a predetermined range and a filter for filtering the limited manipulated variable. The predetermined range is determined based on a past value of the adaptive offset value.

Such limiting process prevents the center value of the amplitude of the modulated signal from abruptly changing even when an impulsive change in the manipulated variable occurs due to disturbance and noise.

The present invention can be applied to various controlled objects. In one embodiment, the controlled object is a phase mechanism for changing a phase of a cam of an engine. The phase mechanism changes the phase of the cam in accordance with the modulated signal.

In the phase mechanism for changing the phase of the cam of the engine, the torque for driving the cam may decrease due to heat generation in the phase mechanism. The friction characteristics of the phase mechanism may change due to variations and/or age deterioration. By applying the control scheme according to the present invention to the phase mechanism, the center value of the amplitude of the modulated signal is changed in accordance with a change of the manipulated variable. Accordingly, the phase can converge to a desired value without generating a steady-state error even when the torque decreases or the friction characteristics change. Since the amplitude of the modulated signal can be kept small, the stability of the phase can be improved. Engine surging caused by the phase change is decreased and the drivability is improved.

In another embodiment, the controlled object is a lift mechanism for changing a lift amount of a valve of an engine. The lift mechanism changes the lift amount in accordance with the modulated signal. In such a lift mechanism, the effects similar to those of the phase mechanism can be achieved.

In yet another embodiment, the controlled object is a system extending from a control mechanism for controlling an air/fuel ratio of an engine to an exhaust gas sensor disposed in an exhaust manifold of the engine. The control mechanism changes the air/fuel ratio in accordance with the modulated signal.

In such a system, a manipulated variable required for achieving an optimal air/fuel ratio may vary due to difference in the fuel properties, deteriorated condition of the catalyst, operating condition of the engine or the like. According to the control scheme of the present invention, since the center value of the amplitude of the modulated signal changes in accordance with a change in the manipulated variable, the output of the exhaust gas sensor can converge to a desired value without generating a steady-state error. As a result, an optimal air/fuel ratio can be achieved. Since the amplitude of the modulated signal can be kept small, the range within which the air/fuel ratio varies can be kept small, which leads to the stability of the torque. Engine surging is decreased and the drivability is improved.

DESCRIPTION OF THE PREFERRED EMBODIMENTS

Figure 1:
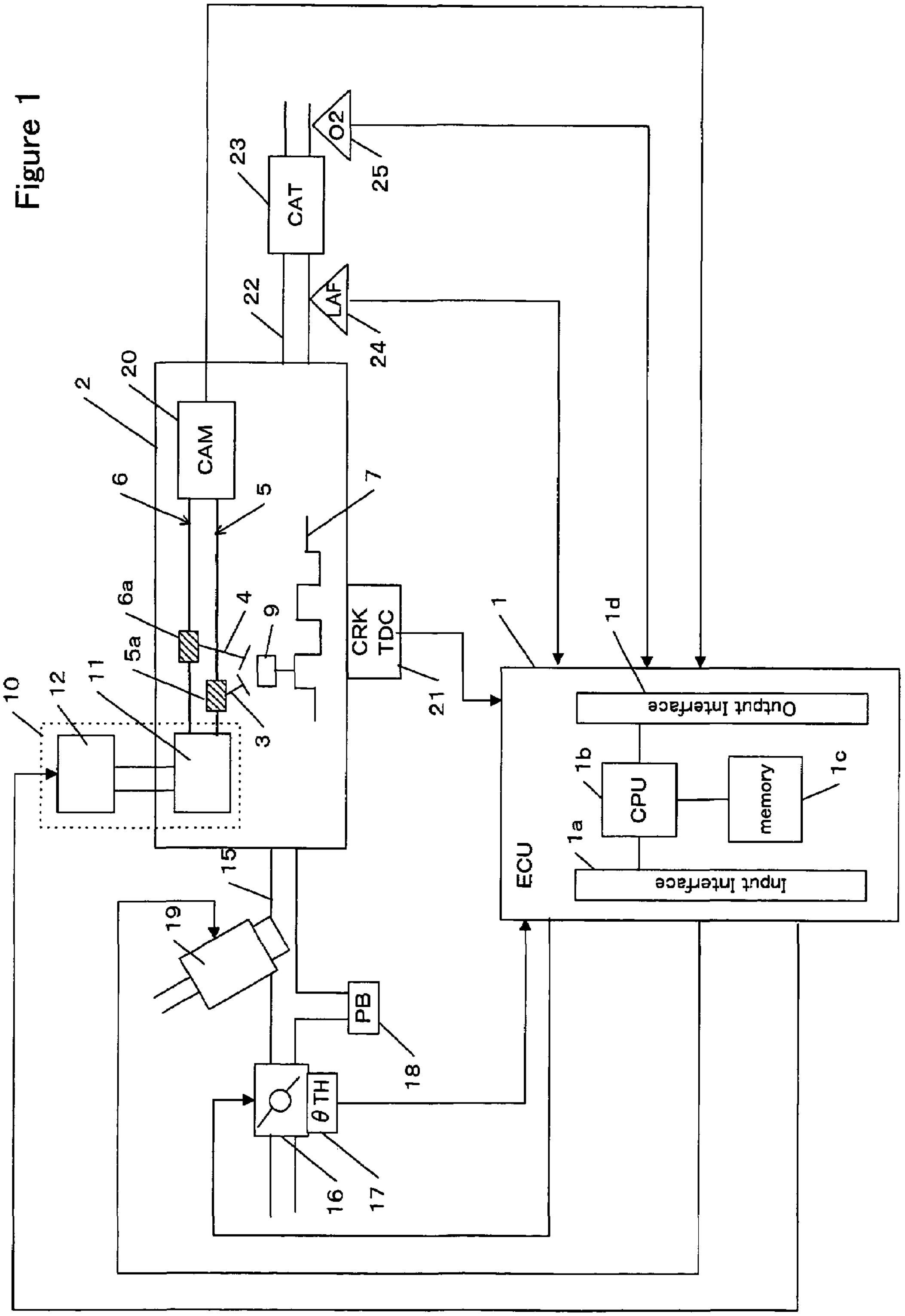
FIG. 1 is a schematic diagram of an engine and a control unit of the engine in accordance with one embodiment of the present invention.

Referring to the drawings, specific embodiments of the invention will be described. FIG. 1 is a block diagram showing an internal combustion engine (hereinafter referred to as an engine) and a control unit for the engine in accordance with one embodiment of the invention.

An electronic control unit (hereinafter referred to as an ECU) 1 is essentially a computer and comprises an input interface 1*a* for receiving data sent from each part of the vehicle, a CPU 1*b* for carrying out operations for controlling each part of the vehicle, a memory 1*c* including a read only memory (ROM) and a random access memory (RAM), and an output interface 1*d* for sending control signals to each part of the vehicle. Programs and various data for controlling each part of the vehicle are stored in the ROM. The ROM may be a rewritable ROM such as an EPROM. The RAM provides work areas for operations by the CPU 1*b*, in which data sent from each part of the vehicle as well as control signals to be sent out to each part of the vehicle are temporarily stored.

An engine 2 is, for example, a 4-cycle, DOHC gasoline engine. The engine 2 comprises an intake camshaft 5 and an exhaust camshaft 6. The intake camshaft 5 has an intake cam 5*a* for driving an intake valve 3 to open and close. The exhaust camshaft 6 has an exhaust cam 6*a* for driving an exhaust valve 4 to open and close. These intake and exhaust camshafts 5 and 6 are connected to a crankshaft 7 via a timing belt (not shown). These camshafts rotate once for every two rotations of the crankshaft 7.

A continuously variable phase device (hereinafter referred to as a "phase device") 10 has a continuously variable phase mechanism (hereinafter referred to as a "phase mechanism") 11 and a hydraulic driving unit 12. The hydraulic driving unit 12 drives the phase mechanism 11 with a hydraulic pressure in accordance with a command value supplied by the ECU 1. In doing so, an actual phase CAIN of the intake cam 5*a* can continuously advance or retard with respect to the crankshaft 7. The phase device 10 will be described in detail later referring to FIG. 2.

A cam angle sensor 20 is disposed at an end portion of the intake camshaft 5. As the intake camshaft 5 rotates, the cam angle sensor 20 outputs to the ECU 1 a CAM signal, which is a pulse signal, at every predetermined cam angle (for example, every one degree).

A throttle valve 16 is disposed in an intake manifold 15 of the engine 2. An opening degree of the throttle valve 16 is controlled by a control signal from the ECU 1. A throttle valve opening sensor (θTH) 17, which is connected to the throttle valve 16, supplies the ECU 1 with an electric signal corresponding to the opening degree of the throttle valve 16.

An intake manifold pressure (Pb) sensor 18 is disposed downstream of the throttle valve 16. The intake manifold pressure Pb detected by the Pb sensor 18 is sent to the ECU 1.

A fuel injection valve 19 is provided, for each cylinder, in the intake manifold 15. The fuel injection valve 19 is supplied with fuel from a fuel tank (not shown) to inject the fuel in accordance with a control signal from the ECU 1.

A crank angle sensor 21 is disposed in the engine 2. The crank angle sensor 21 outputs a CRK signal and a TDC signal to the ECU 1 in accordance with the rotation of the crankshaft 7.

The CRK signal is a pulse signal that is output at every predetermined crank angle (for example, 30 degrees). The ECU 1 calculates a rotational speed NE of the engine 2 in accordance with the CRK signal. The ECU 1 also calculates the phase CAIN based on the CRK signal and the CAM signal. The TDC signal is also a pulse signal that is output at a crank angle associated with a TDC position of a piston 9.

An exhaust manifold 22 is connected on the downstream side of the engine 2. The engine 2 emits exhaust gas through the exhaust manifold 22. A catalytic converter 23, which is disposed in the exhaust manifold 22, purifies undesirable elements such as HC, CO, NOx contained in the exhaust gas.

A wide-range air/fuel ratio (LAF) sensor 24 is disposed upstream of the catalytic converter 23. The LAF sensor 24 detects an air/fuel ratio over a wide range extending from rich to lean. The detected air/fuel ratio is sent to the ECU 1.

An O2 (exhaust gas) sensor 25 is disposed downstream of the catalyst converter 23. The O2 sensor 25 is a binary-type of exhaust gas concentration sensor. The O2 sensor outputs a high level signal when the air/fuel ratio is richer than the stoichiometric air/fuel ratio, and outputs a low level signal when the air/fuel ratio is leaner than the stoichiometric air/fuel ratio. The electric signal is sent to the ECU 1.

Signals sent to the ECU 1 are passed to the input interface 1*a*. The input interface 5*a* converts analog signal values into digital signal values. The CPU 1*b* processes the resulting digital signals, performs operations in accordance with one or more programs stored in the memory 1*c*, and creates control signals. The output interface 1*d* sends these control signals to actuators for the throttle valve 16, hydraulic driving unit 12, fuel injection valve 19 and other mechanical components.

A control scheme in accordance with one embodiment of the present invention will be described. In the embodiment, the controlled object is a phase device. However, it should be noted that a control scheme in accordance with the present invention can be applied to other controlled objects.

Figure 2:
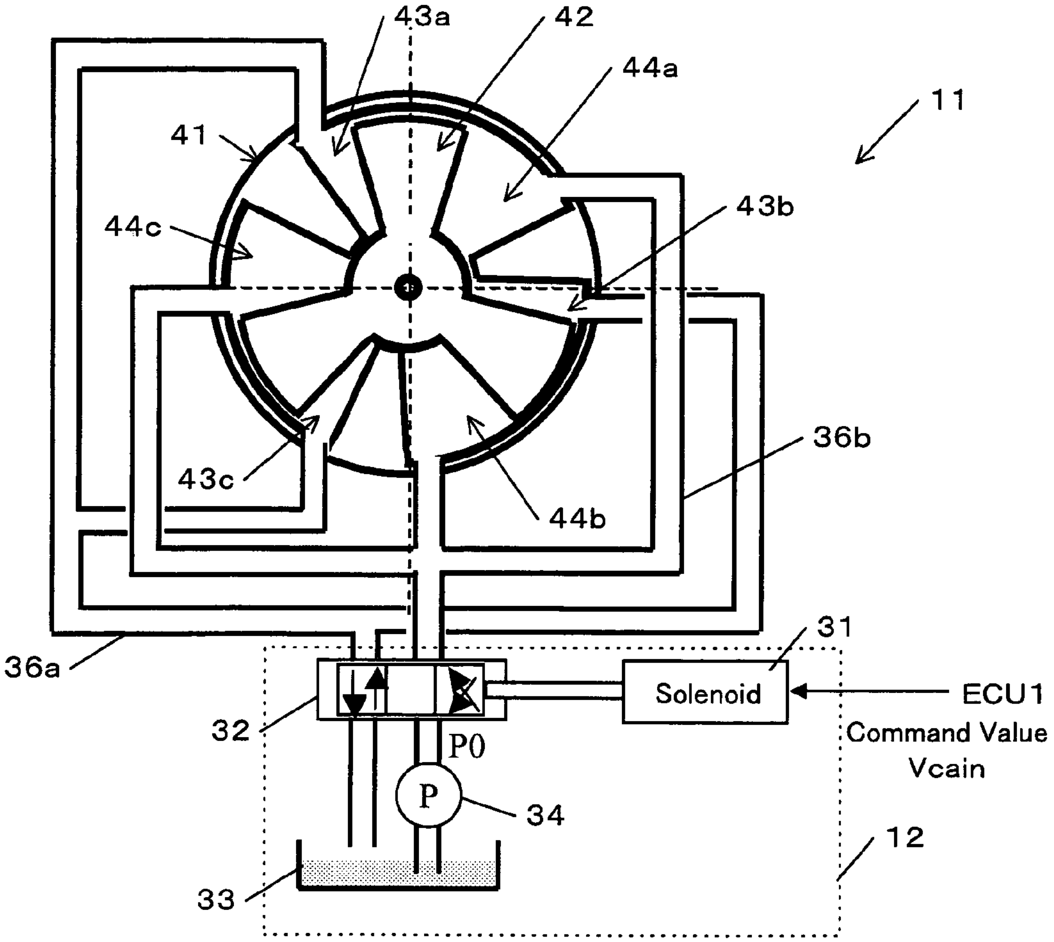
FIG. 2 is a block diagram of a continuously variable phase device in accordance with one embodiment of the present invention.

FIG. 2 shows an example of the phase device 10 shown in FIG. 1. The phase device 10 has the phase mechanism 11 and the hydraulic driving unit 12 as described above.

A command value Vcain is supplied from the ECU 1 to a solenoid 31. The solenoid 31 is energized in accordance with the command value Vcain, and then a hydraulic spool valve 32 is driven by the solenoid 31. The hydraulic spool valve 32 controls the flow of hydraulic fluid from a tank 33 through a pump 34 to the phase mechanism 11.

The hydraulic spool valve 32 is connected to the phase mechanism 11 through an advance oil passage 36*a* and a retard oil passage 36*b*. A hydraulic pressure OP1 of the hydraulic fluid to be supplied to the advance oil passage 36*a* and a hydraulic pressure OP2 of the hydraulic fluid to be supplied to the retard oil passage 36*b* are controlled through the hydraulic spool valve 32 in accordance with the command value Vcain.

The phase mechanism 11 comprises a housing 41 and a vane 42. The housing 41 is connected to the crankshaft 7 through a sprocket and a timing belt (both not shown). The housing 41 rotates in the same direction as the rotation of the crankshaft 7.

The vane 42 extends radially from the intake camshaft 5 that is inserted into the housing 41. The vane 42 is accommodated in the housing 41 in such a manner that it can rotate relative to the housing 41 within a predetermined range. The fan-shaped space formed in the housing 41 is partitioned into three advance chambers 43*a*, 43*b* and 43*c* and three retard chambers 44*a*, 44*b* and 44*c* by the vane 42. The advance passage 36*a* is connected to the three advance chambers 43*a* to 43*c*. The hydraulic fluid of the hydraulic pressure OP1 is supplied to the advance chambers 43*a* to 43*c* through the advance passage 36*a*. The retard passage 36*b* is connected to the three retard chambers 44*a* to 44*c*. The hydraulic fluid of the hydraulic pressure OP2 is supplied to the retard chambers 44*a* to 44*c* through the retard passage 36*b*.

When a difference between the hydraulic pressure OP1 and the hydraulic pressure OP2 is zero, the vane 42 does not rotate relative to the housing 41, so that the value of the phase CAIN is maintained. When the hydraulic pressure OP1 is larger than the hydraulic pressure OP2 in accordance with the command value Vcain from the ECU 1, the vane 42 rotates in the advance direction relative to the housing 41, so that the phase CAIN advances. When the hydraulic pressure OP2 is larger than the hydraulic pressure OP1 in accordance with the command value Vcain from the ECU 1, the vane 42 rotates in the retard direction relative to the housing 41, so that the phase CAIN retards.

In such a phase device, variations may occur in the hydraulic fluid out of the pump. The viscosity of the hydraulic fluid may change. The space between the vane and the housing may change with time. These conditions may change the behavior of the phase device. Therefore, it is preferable to control the phase CAIN so that the phase CAIN converges to a desired value robustly against such changes of the behavior of the phase device.

The phase CAIN changes non-linearly against the change in the hydraulic pressure. A control using the delta-sigma modulation algorithm is effective to a system having such non-linear characteristics.

Figure 3:
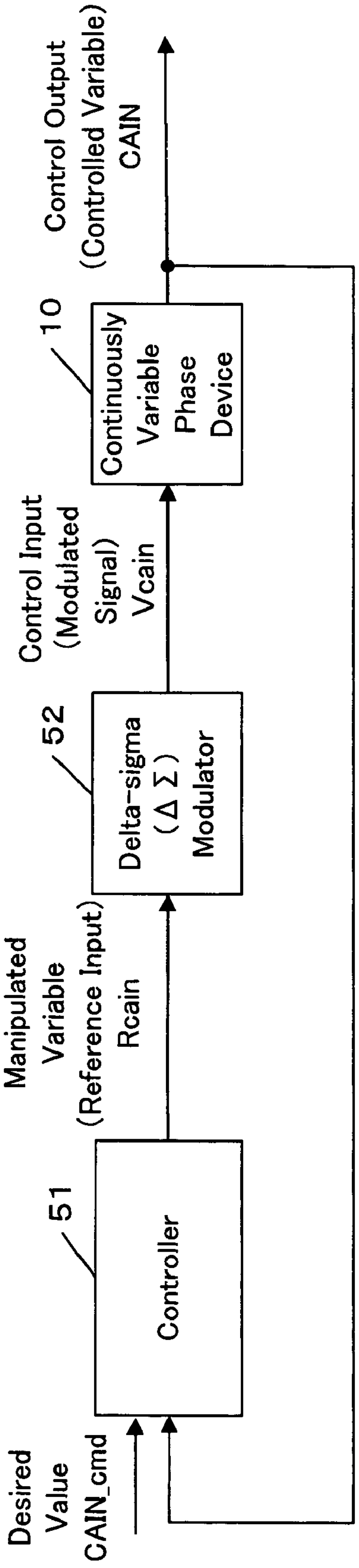
FIG. 3 shows a functional block diagram of a control unit in accordance with one embodiment of the present invention.

FIG. 3 shows a block diagram of a control apparatus for controlling the phase device 10 in accordance with one embodiment of the present invention. The control apparatus comprises a controller 51 and a modulator 52. The functions of the controller 51 and modulator 52 can be implemented in the ECU 1. In one embodiment, the functions are typically implemented by one or more computer programs stored in the memory 1*c* of the ECU 1. Alternatively, the functions may be implemented by software, hardware, firmware or any combination thereof.

As described above, the control input Vcain into the phase device 10 that is a plant (controlled object) is a command value for driving the solenoid 31. A control output CAIN (controlled variable) is an actual phase of the intake cam 5*a* relative to the crankshaft 7.

The controller 51 calculates a manipulated variable Rcain so that the output CAIN of the phase device 10 converges to a desired value CAIN_cmd (more exactly, a modified desired value CAIN_cmd_f as described later). Preferably, the desired value CAIN_cmd is set in accordance with a driving force requested by the driver (which is typically represented by an opening degree of the accelerator pedal) and/or an operating condition of the engine.

In this embodiment, the controller 51 calculates the manipulated variable Rcain by performing a 2-degree-of-freedom sliding mode control. Alternatively, other control schemes may be used to calculate the manipulated variable Rcain. The 2-degree-of-freedom sliding mode control will be described later.

The delta-sigma (ΔΣ) modulator 52 receives the manipulated variable Rcain as a reference input. The delta-sigma modulator 52 uses a delta-sigma (ΔΣ) modulation algorithm to modulate the reference input Rcain. Through the delta-sigma modulation algorithm, the reference input Rcain is modulated to a modulated signal Vcain having switching characteristics. The modulated signal Vcain is a control input to be applied to the phase device 10. By virtue of the switching characteristics of the modulated signal, the phase device 10 is accurately controlled so that the controlled variable CAIN converges to the desired value CAIN_cmd.

Now, the 2-degree-of-freedom sliding mode control will be described. A sliding mode control is a response assignment control that is capable of specifying a convergence speed of a controlled variable. The 2-degree-of-freedom sliding mode control is an extended version of a sliding mode control. According to the 2-degree-of-freedom sliding mode control, a speed that a controlled variable follows a desired value and a speed that a controlled variable converges when disturbance is applied can be separately specified.

As shown in the equation (1), the 2-degree-of-freedom sliding mode controller 51 uses a desired value response assignment parameter POLE_f to apply a first-order delay filter (a low-pass filter) to the desired value CAIN_cmd. The desired value response assignment parameter POLE_f specifies the speed that the controlled variable follows the desired value. It is preferably set to satisfy −1<POLE_f<0. k represents a cycle number.

$$CAIN\_cmd\_f(k)=-\mathrm{POLE\_}f\cdot CAIN\_cmd\_f(k-1)+(1+POLE\_f)\cdot CAIN\_cmd(k) \quad (1)$$

As shown in the equation (1), a trajectory of the desired value CAIN_cmd_f is determined by the desired value response assignment parameter POLE_f. The speed that the controlled variable follows the desired value can be specified in accordance with what trajectory is set for the desired value. The controller 51 calculates the manipulated variable Rcain so that the controlled variable CAIN converges to the desired value CAIN_cmd_f thus modified by the response assignment parameter POLE_f.

The controller 51 defines a switching function σs as shown in the equation (2). Ecain is an error between the actual phase CAIN and the desired value CAIN_cmd_f. The switching function as specifies a convergence behavior of the error Ecain. POLE is a disturbance suppressing response assignment parameter for specifying the speed that the error Ecain, which may occur when disturbance is applied, converges. The response assignment parameter POLE is preferably set to satisfy −1<POLE<0.

$$\sigma s(k)=Ecain(k)+POLE\cdot Ecain(k-1) \quad (2)$$

where Ecain(k)=CAIN(k)−CAIN_cmd_f(k−1)

As shown in the equation (3), the controller 51 determines the control input so that the switching function σs reaches zero.

$$\sigma s(k)=0 \quad (3)$$

$$\Downarrow$$

$$Ecain(k)=-POLE\cdot Ecain(k-1)$$

The equation (3) represents a first-order delay system having no input. The sliding mode control controls the error Ecain so that the error is confined within the first-order delay system shown in the equation (3).

Figure 4:
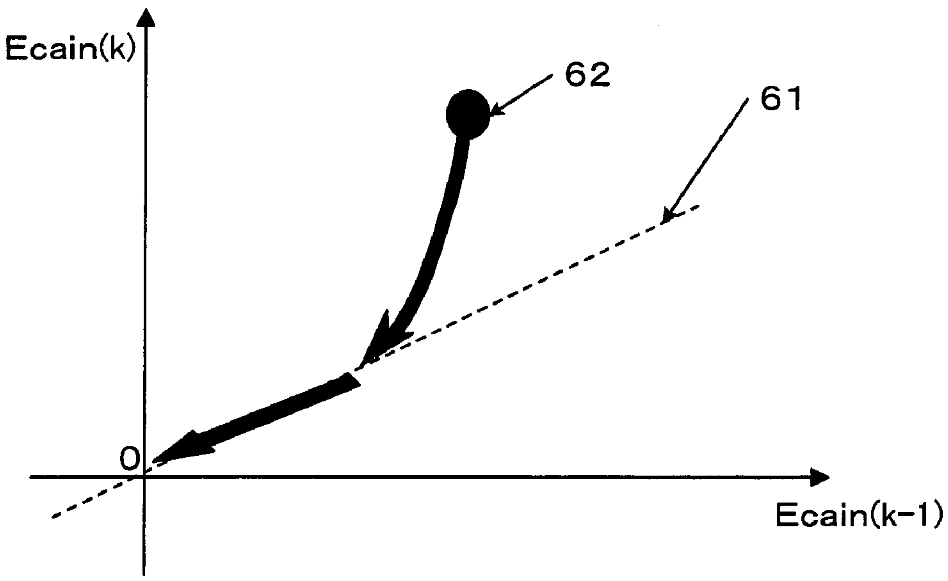
FIG. 4 shows a switching function of a response assignment control in accordance with another embodiment of the present invention.

FIG. 4 shows a phase plane with Ecain(k) on the vertical axis and Ecain(k−1) on the horizontal axis. A switching line 61 expressed by the equation (3) is shown in the phase plane. Assuming that a point 62 is an initial value of a state quantity (Ecain(k−1), Ecain(k)), the controller 51 places the state quantity on the switching line 61 and then constrains it on the switching line 61. Thus, the state quantity automatically converges to the origin (that is, Ecain (k) and Ecain (k−1)=0) of the phase plane with time because the state quantity is confined within the first-order delay system having no input. By constraining the state quantity on the switching line 61, the state quantity can converge to the origin without being influenced by disturbance.

Figure 5:
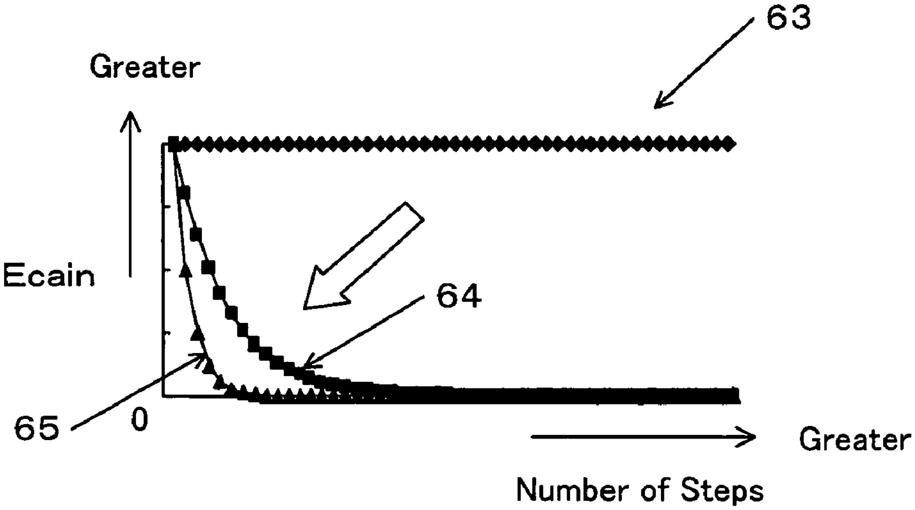
FIG. 5 shows a response assignment parameter of a response assignment control in accordance with another embodiment of the present invention.

Referring to FIG. 5, reference numerals 63, 64 and 65 show the convergence speed of the error Ecain when the disturbance suppressing response assignment parameter POLE takes a value of −1, −0.8 or −0.5, respectively. The convergence speed of the error Ecain increases as the absolute value of the response assignment parameter POLE decreases.

The controller 51 calculates a simplified equivalent control input Rff, a reaching law input Rrch, an adaptive law input Radp and a damper input Rdump to determine the manipulated variable Rcain.

The simplified equivalent control input Rff can be calculated from an equivalent control input. Calculation of the equivalent control input will be described briefly. The equivalent control input needs to satisfy the equation (4) because it is an input for constraining the state quantity on the switching line. Assuming that a plant can be modeled as in the equation (5) (where a1, a2 and b1 are model parameters), the equation (6) can be derived by substituting the equation (5) into the equation (4).

$$\sigma s(k+1)=\sigma s(k) \tag{4}$$

$$CAIN(k+1)=a1\cdot CAIN(k)+a2\cdot CAIN(k-1)+b1\cdot Vcain(k) \tag{5}$$

$$Vcain(k)=\frac{1}{b1}\{\underbrace{(1-a1-POLE)CAIN(k)+(POLE-a2)CAIN(k-1)}_{(I)}\underbrace{+\mathrm{CAIN\_cmd\_f}(k)+(POLE-1)\mathrm{CAIN\_cmd\_f}(k-1)-POLE\cdot\mathrm{CAIN\_cmd\_f}(k-2)\}}_{(II)} \tag{6}$$

Vcain(k) calculated by the equation (6) is the equivalent control input. The equivalent control input has two functions expressed by the term (I) and the term (II). The term (I) indicates an input for causing the state quantity (CAIN(k), CAIN(k−1)) to settle to the desired value when the desired value is constant. The term (II) is a feed-forward input for improving the capability of the state quantity to follow the desired value when the desired value changes. The term (II) is called a simplified equivalent control input. In this embodiment, in fact, a model expression as shown in the equation (5) is not used. In the case where the model expression is not used, only the simplified equivalent control input of the term (II) can be used instead of the equivalent control input so as to improve the following capability to the desired value. The equation (7) shows a calculation expression of the simplified equivalent control input.

$$Rff(k)=CAIN\_cmd\_f(k)+(POLE-1)\cdot CAIN\_cmd\_f(k-1)-POLE\cdot CAIN\_cmd\_f(k-2) \tag{7}$$

The Controller 51 further calculates the reaching law input Rrch in accordance with the equation (8), the adaptive law input Radp in accordance with the equation (9) and the damper input Rdump in accordance with the equation (10). The reaching law input Rrch is an input for placing the state quantity on the switching line. It is calculated as a proportional term of the switching function σs. The adaptive law input Radp is an input for placing the state quantity on the switching line while suppressing the steady-state error. It is calculated as an integral term of the switching function σs. The damper input Rdump is an input for decelerating the actual phase CAIN when the actual phase CAIN excessively accelerates. Krch, Kadp and Kdump are feedback gains that are predetermined by simulation or the like.

$$Rrch(k)=-Krch\cdot\sigma s(k) \tag{8}$$

$$Radp=-Kadp\cdot\sum_{i=0}^{k}\sigma s(k) \tag{9}$$

$$Rdump(k)=-Kdump\cdot(CAIN(k)-CAIN(k-1)) \tag{10}$$

As shown in the equation (11), the controller 51 calculates a sum of the simplified equivalent control input Rff, the reaching law input Rrch, the adaptive law input Radp and the damper input Rdump to determine the manipulated variable Rcain. This manipulated variable Rcain is input into the delta-sigma modulator 52 as a reference input signal.

$$Rcain(k)=Rff(k)+Rrch(k)+Radp(k)+Rdump(k) \tag{11}$$

Figure 6:
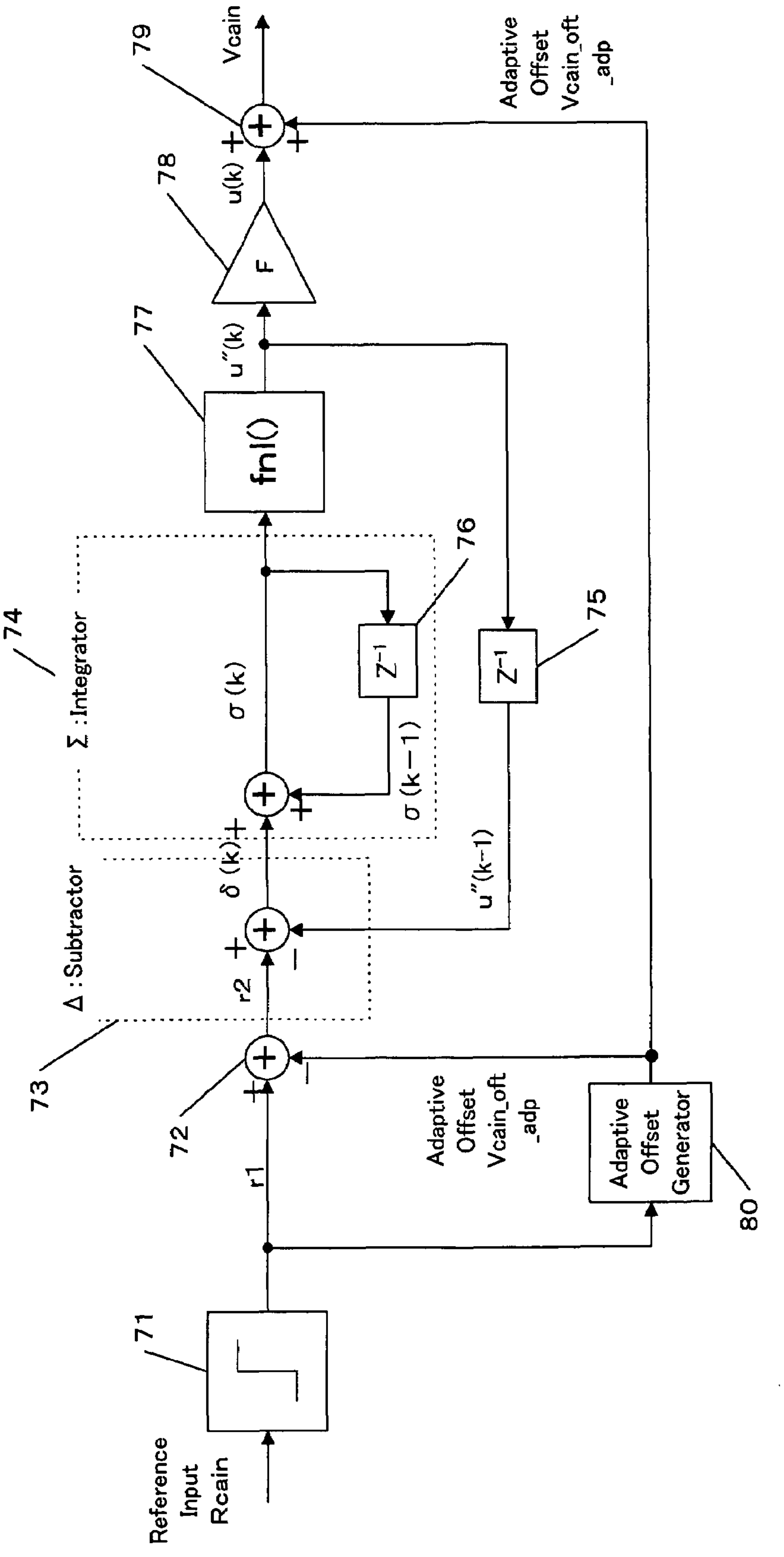
FIG. 6 is a block diagram showing a delta-sigma modulator in accordance with one embodiment of the present invention.

FIG. 6 shows a detailed functional block diagram of the delta-sigma modulator 52. The reference input signal Rcain received from the controller 51 is limited by a limiter 71 as shown in the equation (12). The reference input signal Rcain is limited within a range between a lower limit value (for example, 2V) and an upper limit value (for example, +7V) by a function Lim ( ).

$$r1(k)=Lim(Rcain(k)) \tag{12}$$

If the limiter 71 is not provided, the phase CAIN may exhibit an abrupt change that cannot be observed in a control cycle of the controller. In order to prevent such an uncontrollable condition, the limiter 71 is provided.

As shown in the equation (13), an adaptive offset value Vcain_oft_adp received from the adaptive offset generator 80 is subtracted from an output signal r1 of the limiter 71.

$$r2(k)=r1(k)-Vcain\_oft\_adp(k) \tag{13}$$

A subtractor 73 calculates a difference δ(k) between a signal r2(k) obtained by the offset process and the modulated signal u"(k−1) that is delayed by a delay element 75, as shown in the equation (14). An integrator 74 adds the difference signal δ(k) and the integral σ(k−1) of the difference δ that is delayed by a delay element 76 to determine the integral σ(k) of the difference, as shown in the equation (15).

$$\delta(k)=r2(k)-u''(k-1) \tag{14}$$

$$\sigma(k)=\sigma(k-1)+\delta(k) \tag{15}$$

A non-linear function unit 77 encodes the integral signal σ(k) to output a modulated signal u"(k), as shown in the equation (16). The encoding is performed by applying a non-linear function fnl( ) to the integral signal σ(k), as shown in the equation (17). The non-linear function unit 77 outputs a signal having a value of +R when the integral σ(k) is equal to or larger than zero. The non-linear function unit 77 units outputs a signal having a value of −R when the integral σ(k) is smaller than zero. R is set to have a value that is larger than the maximum absolute value which the reference input signal Rcain can take. Alternatively, the non-linear function unit 77 may output a signal having a value of zero when the integral σ(k) is equal to zero.

$$u''(k) = fnl(\sigma(k)) \tag{16}$$

$$fnl(): \begin{cases} \sigma \geq 0 \longrightarrow fnl(\sigma) = R \\ \sigma < 0 \longrightarrow fnl(\sigma) = -R \end{cases} \tag{17}$$

where $R >$ the maximum of $|r2|$

In a conventional delta-sigma modulator, an encoding function that outputs ±1 is used instead of the non-linear function fnl( ). When such an encoding function is used in the case of $|r2| \geqq 1$, a modulated signal u" held to a maximum value or a minimum value may be generated. If the frequency with which the modulated signal is held to the maximum or minimum is high, the control accuracy may deteriorate. Such a holding condition occurs when the signal r2 exceeds the absolute value (that is, a value of 1) of the modulated signal u" that is fed back to the subtractor 73. In the present embodiment, the non-linear function fnl( ) is introduced so that the absolute value of the modulated signal u" does not have a value of 1 but has a value R larger than the maximum value which the signal r2 can take. Thus, a holding condition of the modulated signal u" can be avoided even when the absolute value of the signal r2 is equal to or larger than 1.

An amplifier 78 amplifies the modulated signal u"(k) as shown in the equation (18) to generate an amplified modulated signal u(k). F is a gain for adjusting the amplitude of the modulated signal Vcain (for example, F=1).

$$u(k)=F \cdot u''(k) \tag{18}$$

An adaptive offset value Vcain_oft_adp received from the adaptive offset generator 80 is added to the amplified modulated signal u(k) as shown in the equation (19) to determine the modulated signal Vcain that is to be applied to the plant.

$$Vcain(k)=u(k)+Vcain\_oft\_adp(k) \tag{19}$$

Figure 7:
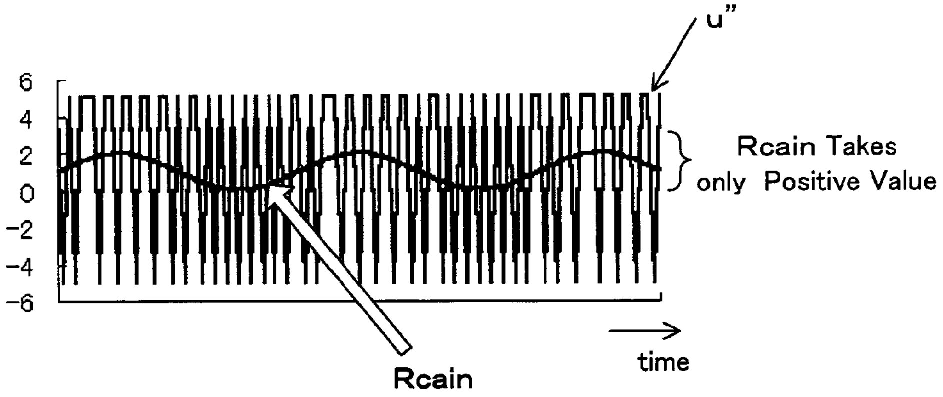
FIG. 7 shows an effect achieved by applying an offset value to a reference input signal of a delta-sigma modulator in accordance with one embodiment of the present invention.
Figure 7:
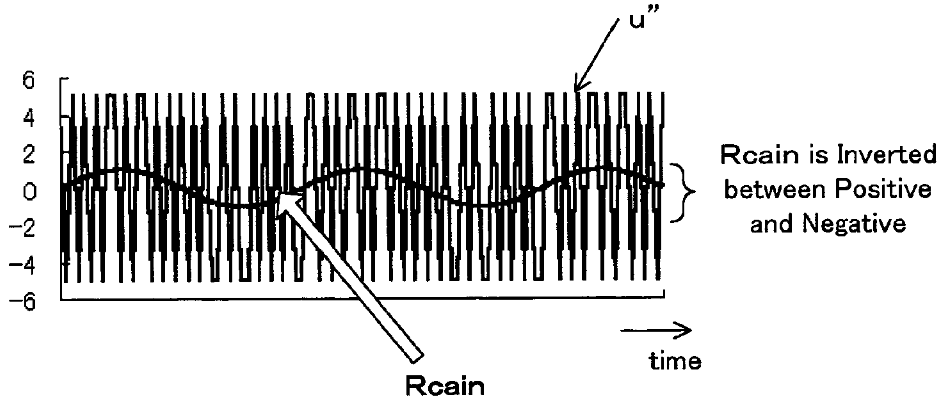

The reason why the subtraction and addition processes of the adaptive offset value Vcain_oft_adt (reference numerals 72 and 79 in FIG. 6) are introduced will be described. In order to improve the control accuracy of the phase CAIN, it is preferable that the frequency with which the control input Vcain is generated as taking a maximum value and the frequency with which the control input Vcain is generated as taking a minimum value are almost the same (namely, 50% each). However, in fact, since the control input Vcain has a positive value, the reference input signal Rcain calculated by the controller 51 has a positive value. As a result, as shown in FIG. 7(*a*), the frequency with which the modulated signal u" is output as taking a maximum value is higher.

In the present embodiment, as shown in the equation (13), an adder 72 subtracts the adaptive offset value Vcain_oft_adp from the reference input signal Rcain (more exactly, the signal r1 obtained after the limiting process). Through this offset process, the frequency with which the modulated signal u" is generated as taking the maximum value and the frequency with which the modulated signal u" is generated as taking the minimum values are almost the same, as shown in FIG. 7(*b*). As shown in the equation (19), the adaptive offset value Vcain_oft_adp is added by an adder 79 when the control input Vcain to be input to the plant is calculated.

Conventionally, the offset value used by the adders 72 and 79 is a fixed value. In contrast, according to the present invention, the offset value is adapted to the reference input signal Rcain. According to one embodiment of the present invention, as shown in FIG. 6, the adaptive offset generator 80 is provided to calculate the offset value $Vcain\_oft_{13}$ adp adapted to the reference input signal Rcain.

The adaptive offset value Vcain_oft_adp is calculated to follow the reference input signal Rcain. By subtracting the adaptive offset value Vcain_oft_adp(k) from the reference input signal Rcain(k) in the adder 72, the modulated signal u(k) is generated as a switching signal that makes the frequency of the maximum value and the frequency of the minimum value equal (refer to FIG. 7).

By adding the adaptive offset value Vcain_of adp(k) to the modulated signal u(k) in the adder 79, the center value of the amplitude of the modulated signal u(k) becomes equal to Vcain_oft_adp(k). Thus, the modulated signal Vcain switches between positive and negative with respect to the center value Vcain_oft_adp. The amplitude of the modulated signal Vcain is determined by the value of R in the non-linear function fnl and the gain F of the amplifier 78.

Thus, since the adaptive offset value Vcain_oft_adp is generated to follow the reference input signal Rcain, the modulated signal Vcain is also generated to follow the reference input signal Rcain.

Figure 8:
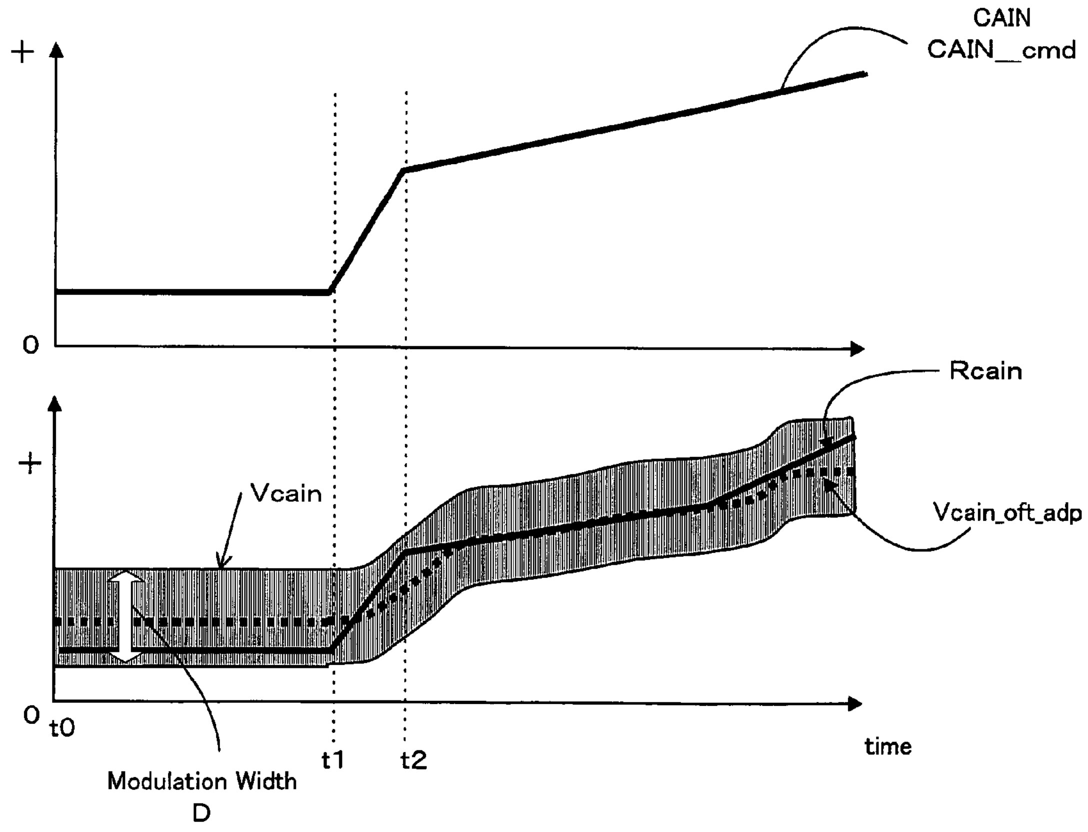
FIG. 8 shows an effect achieved by calculating an adaptive offset value in accordance with one embodiment of the present invention.

The effect achieved by using the adaptive offset value will be described referring to FIG. 8. At time t1, a step-wise change occurs in the reference input signal Rcain. The adaptive offset value Vcain_oft_adp is calculated to follow the reference input signal Rcain with some response delay. The modulated signal Vcain is a switching signal having an amplitude D extending from −R×F to +R×F with respect to the adaptive offset value Vcain_oft_adp (R represents the parameter of the non-linear function 77 and F represents the gain of the amplifier 78 as described above).

Since the center value of the modulated signal Vcain, which is the adaptive offset value Vcain_oft_adp, is calculated to follow the change of the reference input signal Rcain, the reference input signal Rcain does not deviate from the amplitude D of the modulated signal Vcain. Therefore, the phase CAIN can be appropriately controlled to follow the desired value CAIN_cmd (in FIG. 8, the phase CAIN and the desired value CAIN_cmd are shown as a single line because they overlap each other).

The adaptive offset value Vcain_oft_adp is automatically adjusted in accordance with the change of the reference input signal Rcain. Therefore, even when the reference input signal Rcain changes due to changes in the characteristics of the torque by heat generation and/or changes in the friction characteristics by variations and age deterioration in the phase device 10, the phase CAIN can accurately converge to the desired value CAIN_cmd.

Since the offset value Vcain_oft_adp is calculated to adapt to the reference input signal Rcain, there is no need to magnify the amplitude D of the modulated signal so as to contain the maximum and minimum values of the reference input signal Rcain. Since the amplitude of the modulated signal Vcain to be applied to the plant does not need to be magnified, it can be avoided that the control output of the plant or the phase CAIN is destabilized.

Figure 9:
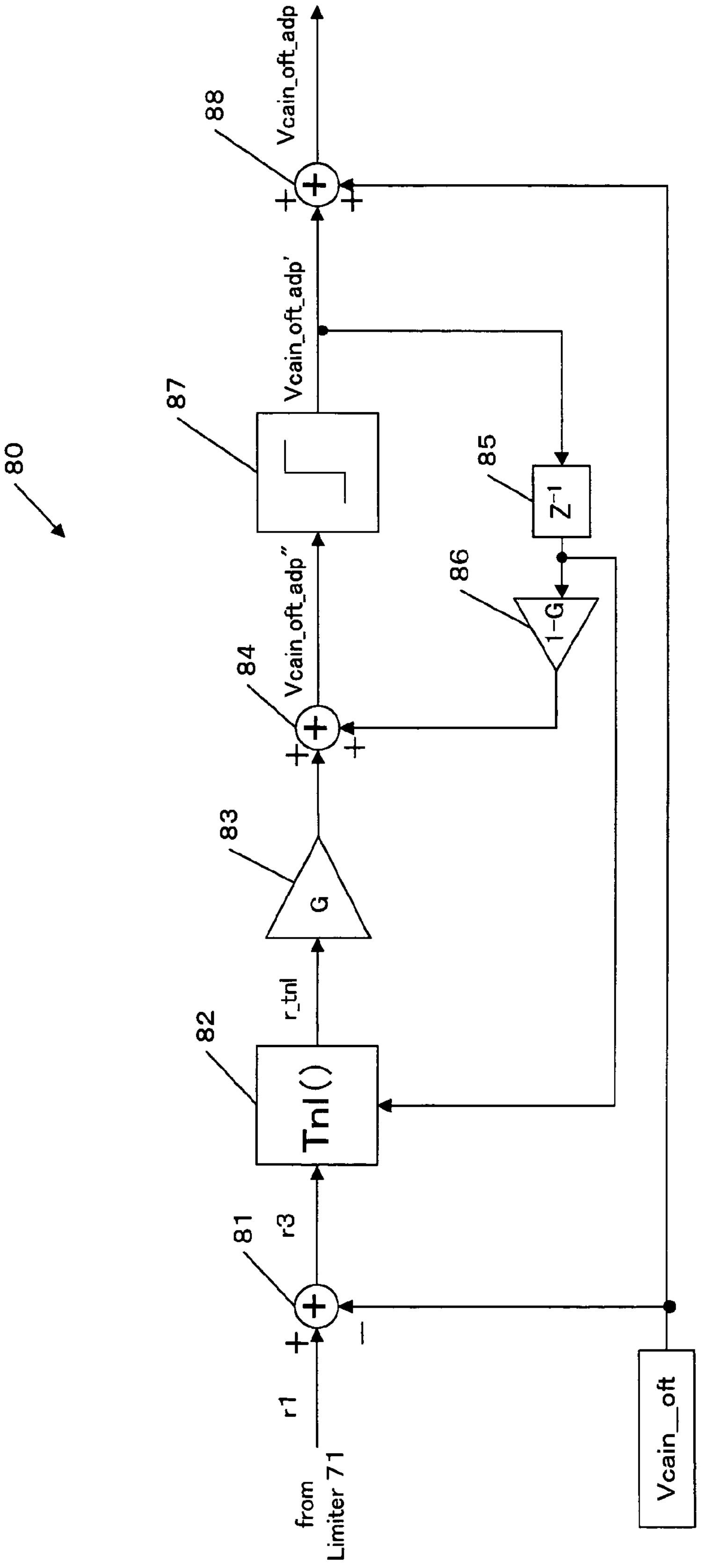
FIG. 9 is a block diagram showing an adaptive offset generator in accordance with one embodiment of the present invention.

FIG. 9 is a block diagram of the adaptive offset generator 80. A predetermined reference offset value Vcain_oft is subtracted from the output signal r1 of the limiter 71 (FIG. 6) to generate a signal r3. A non-linear function unit 82 applies a non-linear function Tnl to the signal r3 as shown in the equation (20).

$$r\_tnl(k) = \begin{cases} \text{Vcain\_oft\_adp}'(k-1) + Eps & (r3(k) > \text{Vcain\_oft\_adp}'(k-1) + Eps) \\ r3 & (\text{Vcain\_oft\_adp}'(k-1) - Eps \le r3(k) \le \text{Vcain\_oft\_adp}'(k-1) + Eps) \\ \text{Vcain\_oft\_adp}'(k-1) - Eps & (r3(k) < \text{Vcain\_oft\_adp}'(k-1) - Eps) \end{cases} \quad (20)$$

The function Tnl outputs the signal r3 when the signal r3 is within a range from (Vcain_oft_adp'(k−1)−Eps(k)) to (Vcain_oft_adp'(k−1)+Eps(k)) When the signal r3 exceeds the upper limit value (Vcain_oft_adp'(k−1)+Eps(k)) of the range, the upper limit value is output. When the signal r3 is below the lower limit value (Vcain_oft_adp'(k−1)−Eps(k)), the lower limit value is output. Thus, the signal r3 is controlled to remain within a predetermined range where the previous offset value Vcain_oft_adp(k−1) (more exactly, Vcain_oft_adp', which is a value obtained by subtracting the reference offset value Vcain_oft from the previous adaptive offset value Vcain_oft_adp(k−1)) is positioned in the center of the range.

If an impulsive behavior that may deviate from the above-described range occurs in the signal r3, the adaptive offset value Vcain_oft_adp may also exhibit an impulsive behavior. Occurrence of such impulsive behavior in the adaptive offset value Vcain_oft_adp can be avoided by applying the function Tnl.

A non-linear filter is configured from an amplifier 83, an adder 84, a delay element 85 and an amplifier 86. The non-linear filter filters a signal r_tnl generated by the non-linear function unit 82 to output an offset correction value Vcain_oft_adp" as shown in the equation (21). G represents a filter coefficient and is set to satisfy 0<G<1.

$$Vcain\_oft\_adp''(k) = (1-G)\cdot Vcain\_oft\_adp'(k-1) + G\cdot r\_tnl(k) \quad (21)$$

When the desired value of the control output CAIN becomes constant, "fluctuation" may occur in the control output. Such "fluctuation" is caused by a large change of the center value of the modulated signal when a momentary change happens in the reference input signal Rcain due to noise and/or impulsive disturbance. The filtering process shown in the equation (21) can suppress "fluctuation" that appears in the control output due to such conditions.

A limiter 87 limits the offset correction value Vcain_oft_adp" in accordance with the equation (22). The offset correction value Vcain_oft_adp" is limited within a range between a lower limit value (for example, −0.5V) and an upper limit value (for example, +3V) by a function Lim'( ). The reason for providing the limiter 87 is the same as for the above-described limiter 71.

$$Vcain\_oft\_adp'(k) = Lim'(Vcain\_oft\_adp''(k)) \quad (22)$$

An adder 88 adds the reference offset value Vcain_oft to the limited offset correction value Vcain_oft_adp' to calculate the adaptive offset value Vcain_oft_adp as shown in the equation (23).

$$Vcain\_oft\_adp(k) = Vcain\_oft\_adp'(k) + Vcain\_oft \quad (23)$$

Thus, the adaptive offset value Vcain_oft_adp corresponding to a difference between the reference input signal Rcain and the reference offset value Vcain_oft is calculated. Through such calculation, the adaptive offset value Vcain_oft_adp follows a change in the reference input signal Rcain.

Figure 10:
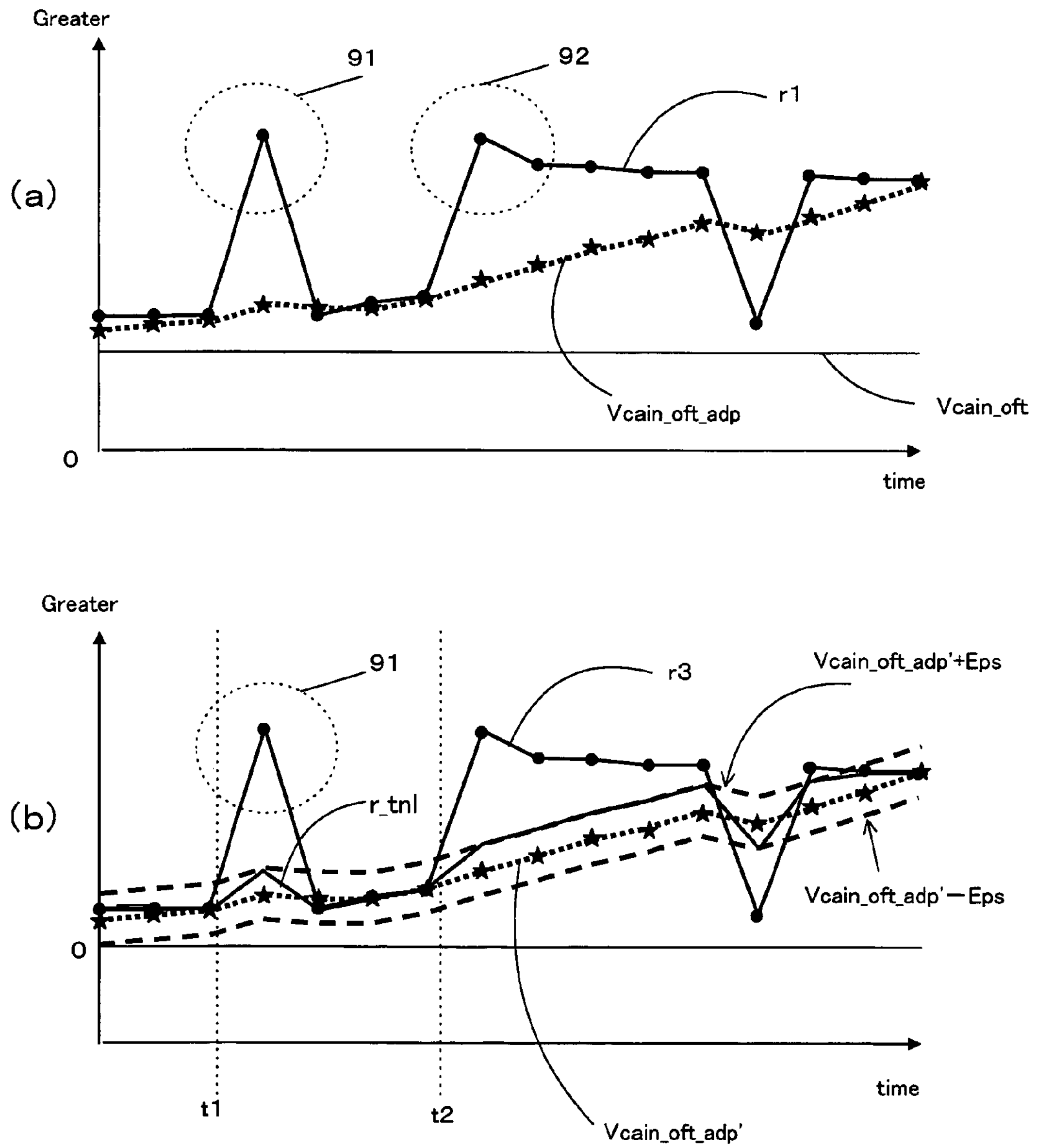
FIG. 10 shows behaviors of various parameters of an adaptive offset generator and an effect achieved by introducing a non-linear function in accordance with one embodiment of the present invention.

Referring to FIG. 10, behaviors of various parameters regarding the adaptive offset generator and the effect achieved by introducing the non-linear function Tnl will be described.

FIG. 10(*a*) shows the signal r1 obtained from the limiting process by the limiter 71. Abrupt changes as shown by reference numerals 91 and 92 occur in the signal r1. This means that such abrupt changes are contained in the reference input signal Rcain.

If the non-linear function Tnl is not introduced, such abrupt changes in the signal r1 may be reflected in the adaptive offset value Vcain_oft_adp because the adaptive offset value is calculated to follow the signal r1. The abrupt changes in the adaptive offset value may cause abrupt changes in the modulated signal Vcain, which may eventually lead to the instability of the control output CAIN. By introducing the non-linear function Tnl, the adaptive offset value Vcain_oft_adp can be calculated so that the adaptive offset value does not follow such abrupt changes in the signal r1 as shown by the reference numerals 91 and 92.

FIG. 10(*b*) shows a signal r3 obtained by subtracting the reference offset value Vcain_oft from the signal r1. As shown by a line r_tnl, the signal r3 is limited by the non-linear function Tnl within the predetermined range (from Vcain_oft_adp'(k−1)−Eps to Vcain_oft_adp'(k−1)+Eps) where Vcain_oft_adp'(k−1) is positioned at the center of the range.

When the signal r3 exhibits an impulsive behavior and hence exceeds the predetermined range as shown at time t1, the signal r3 is limited to the upper limit value (Vcain_oft_adp'(k−1)+Eps) of the predetermined range. When the signal r3 abruptly changes and hence exceeds the predetermined range as shown at time t2, the signal r3 is limited to the upper limit value (Vcain_oft_adp'(k−1)+Eps) of the predetermined range.

Since the output signal r_tnl of the non-linear function unit 82 is determined to be limited within the predetermined range, the value Vcain_oft_adp'calculated based on the output signal r_tnl smoothly changes as shown in FIG. 10(*b*). By adding the reference offset value Vcain_oft to the value Vcain_oft_adp', the adaptive offset value Vcain_oft_adp is determined as shown in FIG. 10(*a*). It is seen that the adaptive offset value Vcain_oft_adp is calculated so that the adaptive offset value does not follow the abrupt changes in the signal r1 as shown by the reference numerals 91 and 92.

Figure 11:
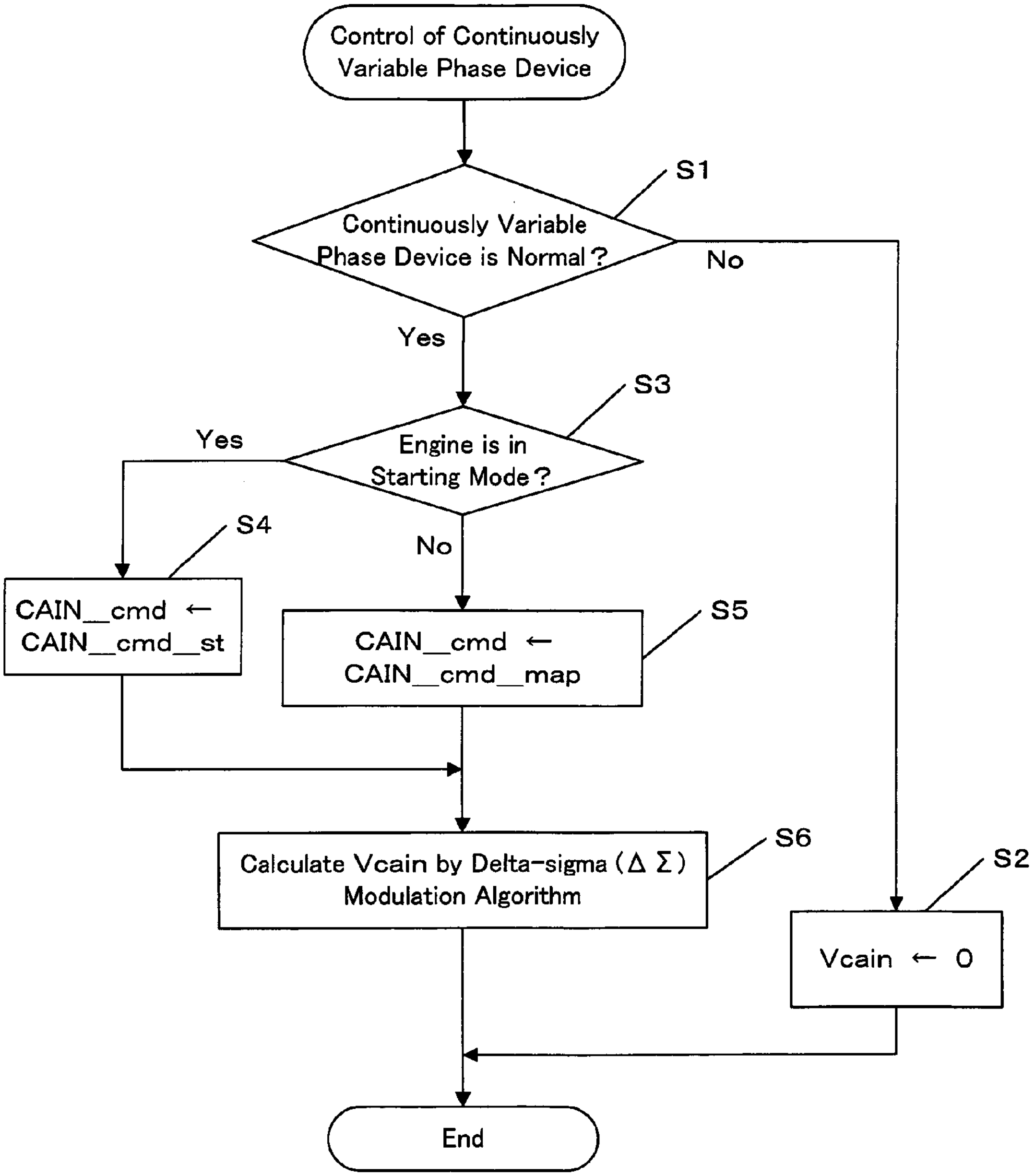
FIG. 11 is a block diagram showing a sigma-delta modulator in accordance with one embodiment of the present invention.

FIG. 11 shows a control flow in accordance with one embodiment of the present invention. This control flow is carried out at a predetermined time interval. This control flow can be carried out by the ECU 1. Typically, this control flow is carried out by one or more programs stored in the memory 1*c* of the ECU 1.

In step S1, it is determined whether the continuously variable phase device 10 is normal. An abnormality (such as a failure etc.) of the phase device can be detected by using any appropriate technique. If an abnormality is detected in the phase device, the control input Vcain is set to zero in step S2. In this embodiment, the phase device is configured so that the actual phase CAIN of the intake camshaft is most retarded when the control input Vcain is zero.

If it is determined in step S1 that the phase device 10 is normal, it is determined whether the engine is in the starting mode (S3). If the engine is in the starting mode, a predetermined value CAIN_cmd_st is set in the desired value CAIN_cmd in step S4. The predetermined value CAIN_cmd_st is set to be slightly advanced (for example, about 10 degrees assuming that the most retarded phase is zero degree) so as to improve in-cylinder flow.

Figure 12:
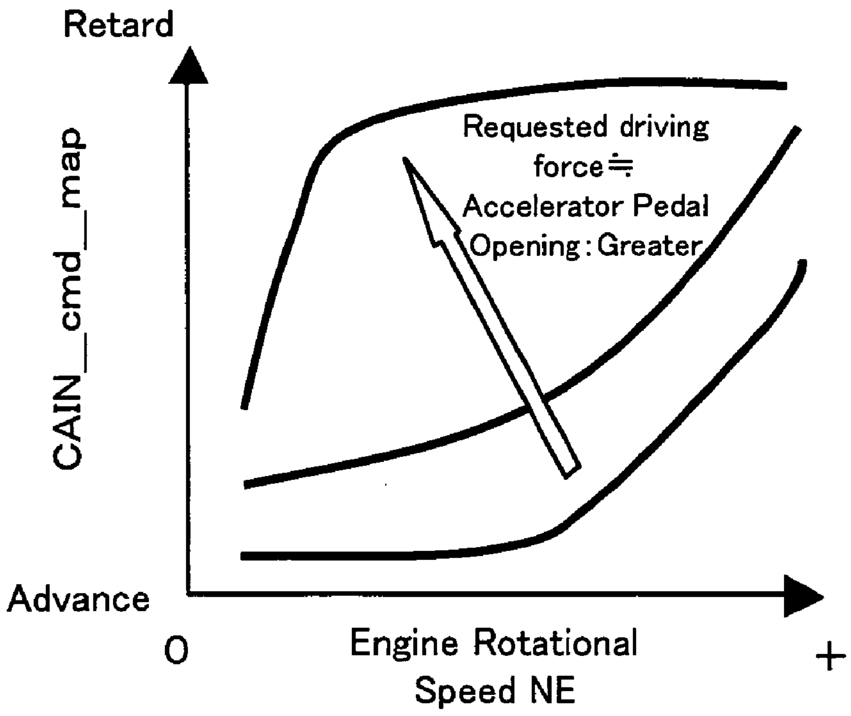
FIG. 12 is a block diagram showing a delta modulator in accordance with one embodiment of the present invention.

If the engine is not in the starting mode, a map is referred to based on the engine rotational speed NE to determine the desired value CAIN_cmd in step S5. An example of the map is shown in FIG. 12. As the rotational speed NE is higher, the desired value CAIN_cmd is set to be more retarded. Furthermore, as the requested driving force (which is typically represented by an opening degree of the accelerator pedal) increases, the desired value CAIN_cmd is set to be more retarded. In this embodiment, when the engine load is low, the driving force of the engine is decreased by causing the combustion of gas remaining in the cylinder of the engine. Therefore, when the engine load is low, the phase CAIN is set to be advanced. As the phase is set to be more advanced, the overlapping time during which both of the exhaust and intake valves are open is longer, increasing the remaining gas used for the combustion.

In step S6, the control input Vcain is calculated through the above-described 2-fegree-iof-freedom sliding mode control and delta-sigma modulation performed by the controller 51 and the modulator 52.

Figure 13:
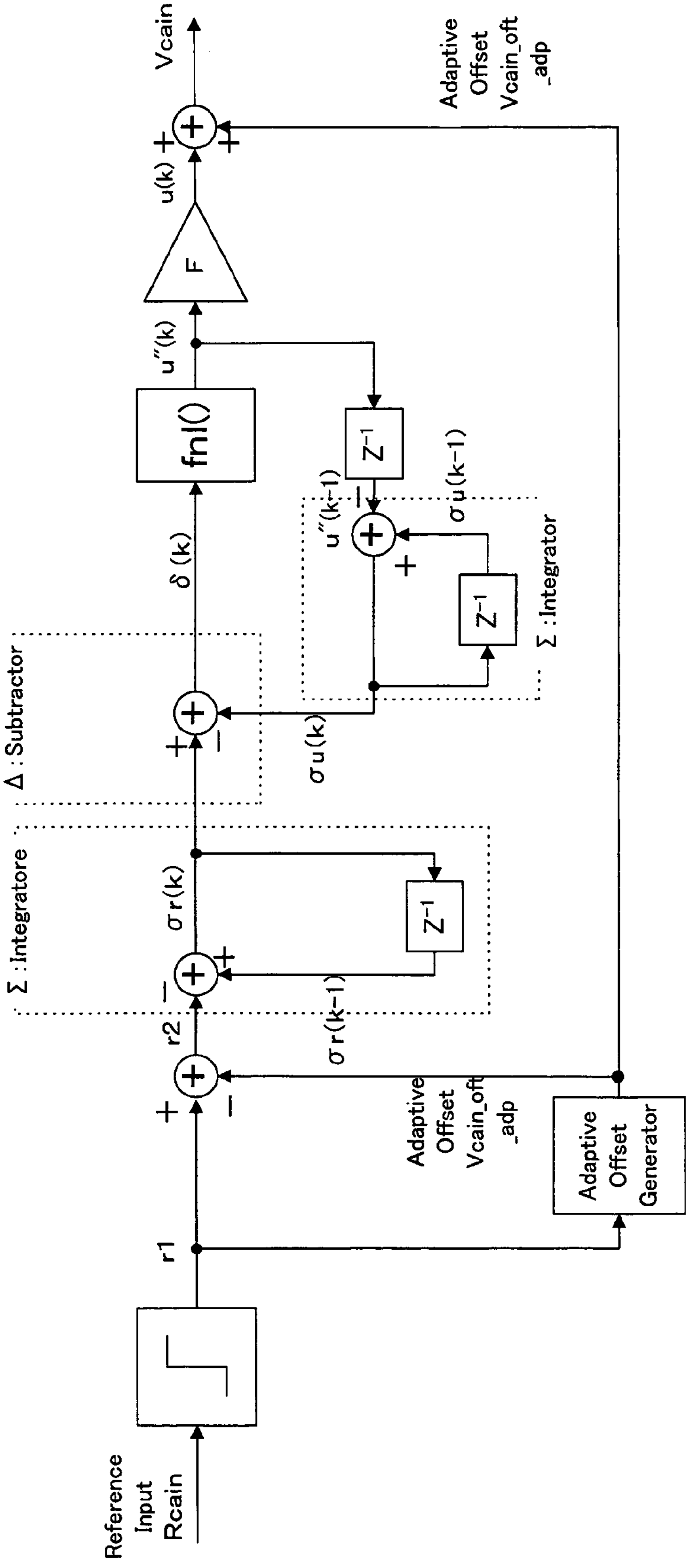
FIG. 13 shows a control flow in accordance with one embodiment of the present invention.

In an alternative embodiment, a sigma-delta (ΣΔ) modulation algorithm or a delta (Δ) modulation algorithm may be used instead of the delta-sigma modulation algorithm. A functional block diagram of a modulator using the sigma-delta modulation algorithm is shown in FIG. 13. Calculation performed by the sigma-delta modulation algorithm is shown in the equations (24) to (31). An adaptive offset value Vcain_oft_adp 5 is calculated in accordance with the method as described above referring to FIG. 9.

$$r1(k)=Lim(Rcain(k)) \quad (24)$$

$$r2(k)=r1(k)-Vcain\_oft\_adp(k) \quad (25)$$

$$\sigma r(k)=\sigma r(k-1)-r2(k) \quad (26)$$

$$\sigma u(k)=\sigma u(k-1)-u''(k-1) \quad (27)$$

$$\delta(k)=\sigma r(k)-\sigma u(k) \quad (28)$$

$$u''(k)=fnl(\delta(k)) \quad (29)$$

$$u(k)=F\cdot u''(k) \quad (30)$$

$$Vcain(k)=u(k)+Vcain\_oft\_adp(k) \quad (31)$$

Figure 14:
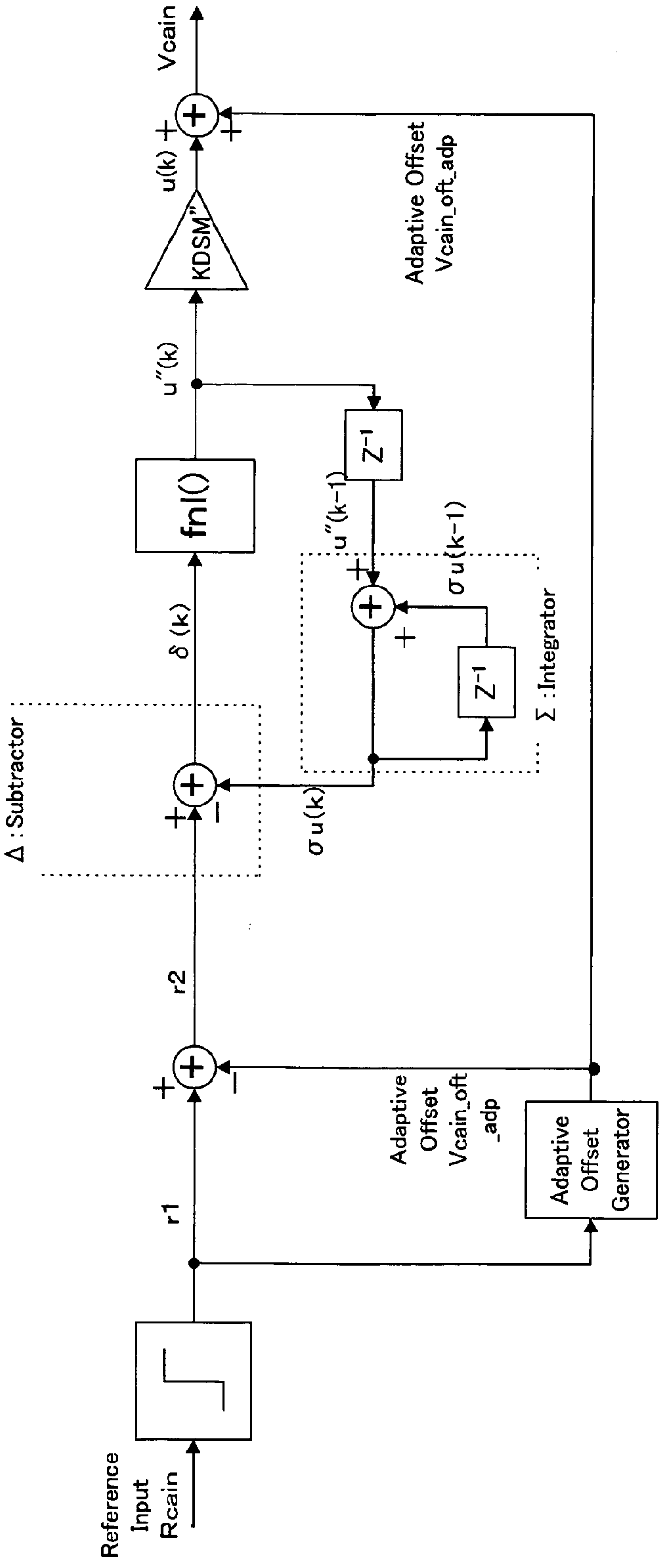
FIG. 14 shows a map used for calculating a desired value for a phase of a cam in accordance with one embodiment of the present invention.
Figure 15:
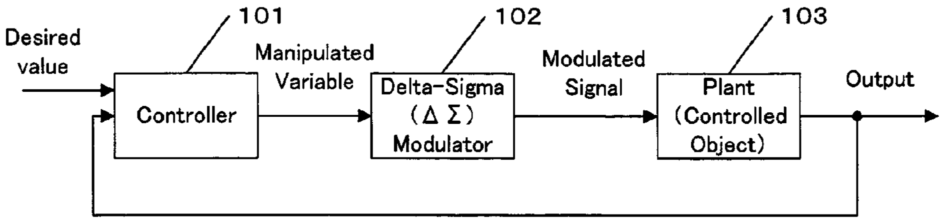
FIG. 15 is a block diagram showing a control apparatus for controlling a plant by using a delta-sigma modulation algorithm in accordance with a conventional technique.
Figure 16:
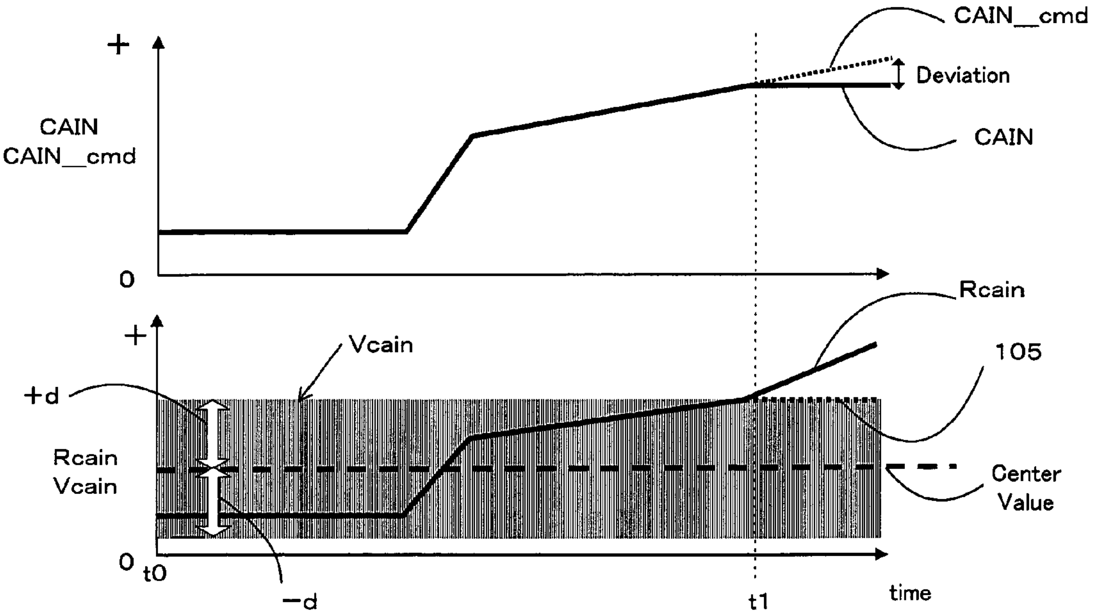
FIG. 16 shows an uncontrollable condition that may occur when a center value of an amplitude of a modulated signal generated by a delta-sigma modulation algorithm is fixed in accordance with a conventional technique.

A functional block diagram of a modulator using the delta 10 modulation algorithm is shown in FIG. 14. Calculation performed by the delta modulation algorithm is shown in the equations (32) to (38). An adaptive offset value Vcain_oft_adp is calculated in accordance with the method as described above referring to FIG. 9.

$$r1(k)=Lim(Rcain(k)) \quad (32)$$

$$r2(k)=r1(k)-Vcain\_oft\_adp(k) \quad (33)$$

$$\sigma u(k)=\sigma u_(k-1)+u''(k-1) \quad (34)$$

$$\delta(k)=r2(k)\sigma u(k) \quad (35)$$

$$u''(k)=fnl(\delta(k)) \quad (36)$$

$$u(k)=F\cdot u''(k) \quad (37)$$

$$Vcain(k)=u(k)+Vcain\_oft\_adp(k) \quad (38)$$

Preferred embodiments have been described above. It should be noted that the phase of the exhaust camshaft can be controlled in a similar way to the control of the phase of the intake camshaft as described above.

Alternatively another response assignment control (for example, a back-stepping control) may be used instead of the 2-degree-of-freedom sliding mode control as described above. The manipulated variable Rcain may be calculated by using another control scheme such as a H∞ control or an optimum control.

The control scheme in accordance with the present invention can be applied to various controlled objects. It should be noted that the control scheme in accordance with the present invention is not limited to the engine of the vehicle.

In one embodiment, a controlled object is a system extending from a control mechanism for controlling an air/fuel ratio of an engine to an exhaust gas sensor (for example, the O2 sensor shown in FIG. 1) that is disposed in an exhaust manifold of the engine. In this case, a controller calculates a manipulated variable to be used for controlling the air/fuel ratio of the engine so that the output of the exhaust gas sensor converges to a desired value. The manipulated variable is, for example, an amount of fuel to be supplied to the engine. The control mechanism drives a fuel injection valve 19 (FIG. 1) so that the amount of fuel thus calculated is supplied to the engine. Thus, the air/fuel ratio of the engine is appropriately controlled.

In another embodiment, a controlled object is an actuator for variably controlling a lift amount of an intake valve and/or an exhaust valve of an engine. A controller calculates a manipulated variable so that the lift amount of the valve converges to a desired value. The actuator changes the lift amount of the valve in accordance with the manipulated variable. Thus, the amount of air to be taken into the engine can be appropriately controlled.

The present invention can be applied to a general-purpose engine (for example, an outboard motor).

What is claimed is:

1. A control apparatus comprising:

a controller for determining a manipulated variable for manipulating a controlled object to cause an output of the controlled object to converge to a desired value; and a modulator for modulating the manipulated variable by using one of a delta-sigma modulation algorithm, a sigma-delta modulation algorithm and a delta modulation algorithm to generate a modulated signal;

an adaptive offset generator for generating an adaptive offset value that follows a change in the manipulated variable; and an offset element for offsetting the modulated signal in accordance with the adaptive offset value such that the central value of the amplitude of the modulated signal becomes equal to the adaptive offset value, thereby causing the modulated signal applied to the controlled object to follow the manipulated variable.

2. The control apparatus of claim 1, wherein the magnitude of the amplitude of the modulated signal is constant independent of a change in the manipulated variable.

3. The control apparatus of claim 2, wherein the adaptive offset generator includes a filter for filtering the manipulated variable to suppress an abrupt change of the adaptive offset value, and wherein the adaptive offset generator generates the adaptive offset value based on an output from the filter.

4. The control apparatus of claim 3, wherein the adaptive offset generator further includes a unit for limiting the manipulated variable within a predetermined range, the predetermined range being determined based on a past value of the adaptive offset value, and wherein the filter filters the limited manipulated variable.

5. The control apparatus of claim 1, wherein:

the controlled object is a phase mechanism for changing a phase of a cam of an engine;

the output of the controlled object is the phase of the cam; and the phase mechanism changes the phase of the cam in accordance with the modulated signal.

6. The control apparatus of claim 1, wherein:

the controlled object is a lift mechanism for changing a lift amount of a valve of an engine;

the output of the controlled object is the lift amount of the valve; and the lift mechanism changes the lift amount of the valve in accordance with the modulated signal.

7. The control apparatus of claim 1, wherein:

the controlled object is a system extending from a control mechanism for controlling an air/fuel ratio of an engine to an exhaust gas sensor disposed in an exhaust manifold of the engine;

the output of the controlled object is an output of the exhaust gas sensor; and the control mechanism changes the air/fuel ratio of the engine in accordance with the modulated signal.

8. A method for controlling a controlled object, the method comprising the steps of:

determining a manipulated variable for manipulating the controlled object to cause an output of the controlled object to converge to a desired value;

modulating the manipulated variable by using one of a delta-sigma modulation algorithm, a sigma-delta modulation algorithm and a delta modulation algorithm; and through the modulation of the manipulated variable, generating a modulated signal that is to be applied to the controlled object so that a center value of an amplitude of the modulated signal follows a change of the manipulated variable.

9. The method of claim 8, further comprising the step of generating an adaptive offset value based on the manipulated variable, wherein the step of generating a modulated signal includes generating the modulated signal so that the adaptive offset value is the center value of the amplitude of the modulated signal.

10. The method of claim 9, further comprising the step of filtering the manipulated variable to suppress an abrupt change of the adaptive offset value, wherein the step of generating an adaptive offset value includes generating the adaptive offset value based on an output from the filtering.

11. The method of claim 10, further comprising the step of limiting the manipulated variable within a predetermined range, the predetermined range being determined based on a past value of the adaptive offset value, wherein the step of filtering includes filtering the limited manipulated variable.

12. The method of claim 8, wherein:

the controlled object is a phase mechanism for changing a phase of a cam of an engine;

the output of the controlled object is the phase of the cam; and the method further comprises the step of changing the phase of the cam by the phase mechanism in accordance with the modulated signal.

13. The method of claim 8, wherein:

the controlled object is a lift mechanism for changing a lift amount of a valve of an engine;

the output of the controlled object is the lift amount of the valve; and the method further comprises the step of changing the lift amount of the valve by the lift mechanism in accordance with the modulated signal.

14. The method of claim 8, wherein:

the controlled object is a system extending from a control mechanism for controlling an air/fuel ratio of an engine to an exhaust gas sensor disposed in an exhaust manifold of the engine;

the output of the controlled object is an output of the exhaust gas sensor; and the method further comprises the step of changing the air/fuel ratio of the engine by the control mechanism in accordance with the modulated signal.

15. A control apparatus comprising:

manipulation means for determining a manipulated variable for manipulating the controlled object to cause an output of the controlled object to converge to a desired value; and modulation means for modulating the manipulated variable by using one of a delta-sigma modulation algorithm, a sigma-delta modulation algorithm and a delta modulation algorithm to generate a modulated signal that is to be applied to the controlled object, the modulation means generating the modulated signal so that a center value of an amplitude of the modulated signal follows a change of the manipulated variable.

16. The control apparatus of claim 15, further comprising offset generating means for generating an adaptive offset value based on the manipulated variable, wherein the modulation means generates the modulated signal so that the adaptive offset value is the center value of the amplitude of the modulated signal.

17. The control apparatus of claim 16, further comprising filtering means for filtering the manipulated variable to suppress an abrupt change of the adaptive offset value, wherein the offset generating means generates the adaptive offset value based on an output from the filter.

18. The control apparatus of claim 17, further comprising limiting means for limiting the manipulated variable within a predetermined range, the predetermined range being determined based on a past value of the adaptive offset value, wherein the filtering means filters the limited manipulated variable.

19. The control apparatus of claim 15, wherein: the controlled object is a phase mechanism for changing a phase of a cam of an engine;

the output of the controlled object is the phase of the cam; and the phase mechanism changes the phase of the cam in accordance with the modulated signal.

20. The control apparatus of claim 15, wherein:

the controlled object is a lift mechanism for changing a lift amount of a valve of an engine;

the output of the controlled object is the lift amount of the valve; and the lift mechanism changes the lift amount of the valve in accordance with the modulated signal.

21. The control apparatus of claim 15, wherein:

the controlled object is a system extending from a control mechanism for controlling an air/fuel ratio of an engine to an exhaust gas sensor disposed in an exhaust manifold of the engine;

the output of the controlled object is an output of the exhaust gas sensor; and the control mechanism changes the air/fuel ratio of the engine in accordance with the modulated signal.

* * * * *